Feb. 18, 1936. E. S. MOUSSEAU 2,031,278
HOSE SUPPORT
Original Filed Dec. 6, 1933
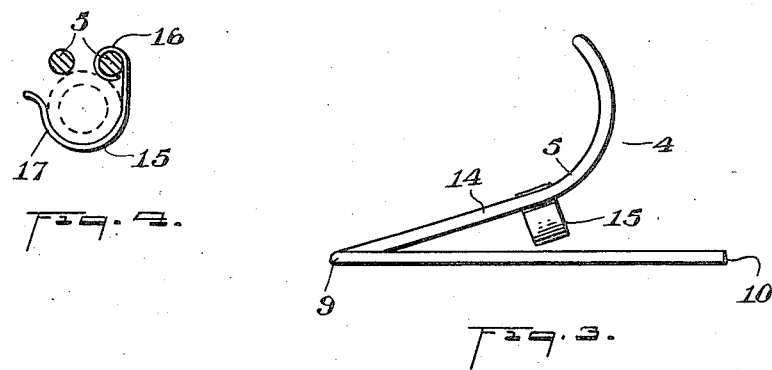
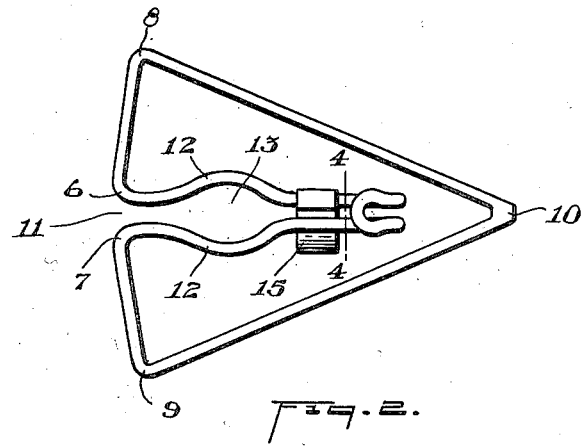
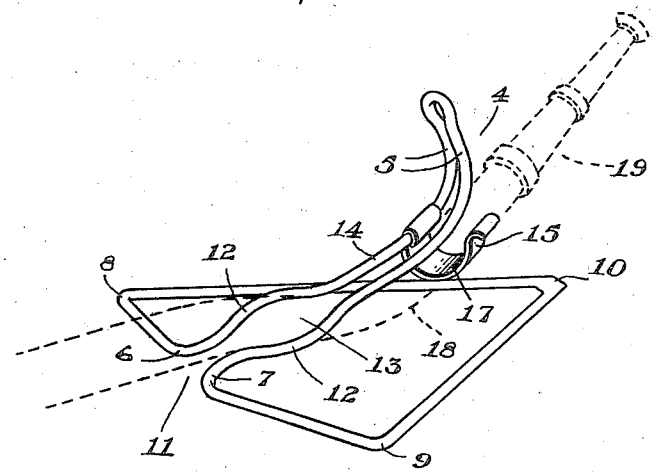
INVENTOR.
EMILE S. MOUSSEAU.
BY Eugene E. Stevens
ATT'Y.

Patented Feb. 18, 1936

2,031,278

UNITED STATES PATENT OFFICE 2,031,278

HOSE SUPPORT

Emile Sylvio Mousseau, Ottawa, Ontario, Canada, assignor to George B. Jenkinson, Prescott, Ontario, Canada Application December 6, 1933, Serial No. 701,197. Renewed January 2, 1936. In Canada December 30, 1932

2 Claims. (Cl. 248—80)

My invention relates to improvements in garden hose supports and especially to a support designed to hold the end of the hose at any desired angle.

The main object of my invention is to provide a hose support on which the hose may be fastened very easily without the necessity of removing the nozzle from said hose.

A further object of the invention consists in the provision of an extremely simple arrangement in the form of a curved standard whereby the angle of the hose with respect to the ground may be readily varied by merely pushing or pulling the hose towards or away from the support.

A further object of the invention is to provide a device of this character which is extremely simple in construction and which may be manufactured in quantity very readily.

With these and other objects in view the invention will be apparent from the following description and accompanying drawing in which—

Figure 1 is a perspective view of my support showing the position of the hose in dotted lines.

Figure 2 is a top view of the support.

Figure 3 is a side elevation thereof.

Figure 4 is an enlarged section taken on the line 4—4 of Figure 2 and showing a cross-section of the hose in dotted lines as in mounted position.

Similar reference symbols indicate similar and/or corresponding parts throughout the drawing.

The support may be made out of any suitable material and may take any convenient form, it being preferable to construct it from round steel wire, although other metals may be employed and the metal may be of any cross section.

In the form illustrated the device consists in a structure made out of a single piece of material which is bent upon itself to form a standard 4 formed by two substantially parallel arms 5 which are conveniently uniformly bent to form a curved standard, each arm being bent in a substantially opposite direction as at 6 and 7 and then bent as at 8 and 9 so that their free ends will join as at 10 to form a substantially triangular base, the portions of which lie in the same horizontal plane. The arms when bent away from each other are spaced as at 11 to form what may be called a mouth and the arms forming the standard may be curved away from each other, as at 12, to form what may be called a throat 13.

As seen in Figure 1, the standard preferably comprises the curved portion 4 having a straight portion 14 which rises from the base at an angle and gradually merges into the curved portion. On the other hand, the standard may be formed differently so that the greater part of its length is formed curved and the curving may gradually increase so that the hose, when attached to the standard, may be moved to various different angles with respect to the standard.

On one of the arms of the standard is mounted a flat metal clip 15 which may be of somewhat resilient nature. One end of clip 15 is bent into a sleeve 16 to fit around one arm of the standard but loosely enough so that it may slide thereon, and it is preferable that the clip be swingable with respect to the arm. The body of the clip is bent as shown at 17 so as to form a substantially semi-circular clamp conforming to the shape of the hose. The wire is welded at some point so as to form a continuous piece, and this may be preferably done by electric spot-welding as at 10.

In use the hose, complete with nozzle, is passed for a certain length through the base of the support and forced through the mouth 11 so that it will be in the position shown at 18 Figure 1. Clip 15 is then passed around the hose so as to encircle and thereby hold the same against the curved standard. By pushing the hose through throat 13, its end and clip 15 will slide along the standard to any angle such as shown at 19 in Figure 1. By pulling the hose, it will return to its original angle or to any desired angle therebetween.

It will be apparent that when the free end of the hose is in the clip 15 and held against the curved standard and then passes through the opening or throat between the arms 5 that the hose will lie upon the shoulders formed by the bends 6 and 7 at the mouth 11, so that said shoulders tend to arch the hose at this point. This will assist in holding the hose stationary in any position to which it is adjusted on the standard.

It is obvious, therefore, having regard to the curvature of the standard and the slidable clip, that the arrangement provides for holding the nozzle of the hose at any desired angle and adjustment is effected in a very simple and easy manner. To remove the hose it is only necessary to shift the clip and pass the hose downwardly through the mouth 11. This is easily accomplished owing to the resilient nature of the wire. On the other hand, in mounting the hose on the standard it is only necessary to place the free end in the clip and pull upwardly on the hose to draw it up through the mouth 11, when the hose will assume the position shown in dotted line in Figure 1.

Various modifications may be made in the invention without departing from the spirit thereof or the scope of the claims, and therefore the exact forms shown are to be taken as illustrative only and not in a limiting sense, and I desire that only such limitations shall be placed thereon as are imposed by the prior art or are specifically set forth in the appended claims.

What I claim as my invention is:

1. In a hose support, a curved standard and means slidable on the standard adapted to secure a hose to said standard whereby the angle of the hose with respect to the standard may be varied.

2. In a hose support a curved standard, a clip adapted to embrace the hose, slidably mounted upon said standard, means integral with said support co-operating with said clip for firmly retaining the hose in mounted position upon the standard.

EMILE SYLVIO MOUSSEAU.